Patented Aug. 6, 1935

2,010,426

UNITED STATES PATENT OFFICE 2,010,426

ESTERIFICATION PROCESS

Joseph P. Burke, Highland Park, N. J., assignor to E. I. du Pont de Nemours & Company, Wilmington, Del., a corporation of Delaware No Drawing. Application January 28, 1932, Serial No. 589,531

10 Claims. (Cl. 260—103)

This invention relates to a process of esterification, and more particularly to a process of esterifying an alcohol with an acid in the presence of a chlorinated hydrocarbon as a water carrier.

The esterification of an alcohol with an acid is a well known reaction, usually being carried out with an excess of the alcohol in the presence of a catalyst such as sulphuric acid. Such reactions may be carried out in a simple still kettle, the reaction mixture being refluxed and the binary mixture of vapors of the water, formed by the reaction, and the alcohol being distilled off during the reaction. In this process the water and alcohol condensate usually forms into two layers, one comprising chiefly alcohol which is returned to the reaction zone, and the other water and alcohol. The content of the alcohol in this water-alcohol layer is usually so great that it is necessary as a matter of economy to rework the layer to separate the alcohol, a serious objection to the process.

This process has another objection, namely, that a temperature which is sufficiently high at the top of the column to distill over the alcohol-water binary, frequently necessitates a temperature at the bottom of the kettle of such magnitude as to cause charring and discoloration of the finished ester. The high temperature at the bottom of the kettle is also disadvantageous in that the alcohol, particularly when a catalyst such as sulphuric acid is used, is decomposed to some extent, such decomposition retarding the esterification and appreciably reducing the efficiency of the process.

To overcome the above disadvantages in part, a so-called water carrier, such as benzol, toluol, and other hydrocarbons, has been introduced into the still kettle, the vapors of this water carrier forming a ternary mixture with the water and alcohol vapors. This ternary mixture is distilled off, condensed and allowed to stratify into two layers, one layer consisting of the water carrier with some alcohol, which is returned to the still, and the other consisting of alcohol and water. The alcohol-water layer must be reworked to recover the alcohol, this process having the same disadvantage as the first described process in this respect. The ternary mixture, however, does permit a lower temperature at the top of the still, which allows a lower temperature to be used at the bottom of the kettle, thus avoiding decomposition and allowing esters of fairly good color to be obtained.

An object of the present invention is to provide a process whereby the water formed during the esterification is removed from the reaction zone without removal of the alcohol. A further object of the invention is to provide a process in which the decomposition of the alcohol, particularly where a higher alcohol is used, is avoided. A further object is to secure an improved color in the finished ester and also an increased yield of the finished ester. A further object is to provide an efficient and economical process for the preparation of esters in general, and particularly esters such as diamyl phthalate. Other objects will be apparent from the description given hereinafter.

The above objects are accomplished according to the present invention by esterifying an alcohol with an acid in the presence of an alkylene dichloride having a boiling point of at least 30° C. lower than the boiling point of the alcohol, while removing from the reaction mixture vapors of the water and the alkylene dichloride.

This process may be conveniently carried out in a still kettle into which the alcohol, acid, alkylene dichloride as a water carrier, and a catalyst, if desired, are introduced. The kettle is heated and maintained at a high enough temperature to cause the binary mixture of water, formed by the reaction, and water carrier vapors to distill off. The vapors are condensed and allowed to stratify and the layer containing the water carrier is returned to the kettle for further work as a water carrier. When the theoretical amount of water has been distilled from the reaction zone, the ester formed is neutralized, washed and refined by means well known in the art. The water layer of the condensate may be discarded inasmuch as it contains only a very slight amount of the water carrier, frequently less than one percent. In this process no alcohol is carried over with the carrier.

The following examples are given to illustrate preferred embodiments of the invention:

EXAMPLE 1.—PREPARATION OF DIBUTYL PHTHALATE

Kettle charge

| | |
|---|---|
| Phthalic anhydride | 200.0 grams |
| Butyl alcohol | 300.0 grams |
| Sulphuric acid (catalyst) | 0.6 cc. |
| Ethylene dichloride (water carrier) | 125.0 grams |

The raw materials were charged into the still which was heated, the materials being allowed to reflux for about thirty minutes. The temperature of the charge remains below 120° C. and the water-ethylene dichloride binary leaves the top of the column at 71–72° C. When the theoretical amount of water had been removed from the reaction system (in this case approximately 29 cc.), the heating was stopped. The ethylene dichloride which formed the bottom layer of the condensates of the vapors was returned to the kettle for further use as a water carrier during the reaction. The material remaining in the kettle was cooled, neutralized with 15 grams of potassium carbonate and 50 cc. of water, then washed twice with 250 cc. of water, separated, and vacuum distilled to remove the ethylene dichloride and the excess butyl alcohol from the ester.

The ester obtained was greatly improved in color, that is, more closely approximated water white, as compared to the color shown by an ester made in the same manner without using a water carrier. The yield of dibutyl phthalate based on the phthalic anhydride consumed was 96% of theoretical.

EXAMPLE 2.—PREPARATION OF DI-METHOXYETHYL PHTHALATE

Kettle charge

| | |
|---|---|
| Phthalic anhydride | 200.0 grams |
| Methoxyethyl alcohol | 275.0 grams |
| Sulphuric acid (catalyst) | .25 cc. |
| Ethylene dichloride (water carrier) | 125.0 grams |

The raw materials were charged into a still kettle and the kettle heated to a temperature of about 115–125° C. The ethylene dichloride formed a binary with the water resulting from the esterification reaction and was distilled off at 71–72° C. During the course of the reaction, the ethylene dichloride which separated from the water in the distillate collector was returned to the kettle for further use as a water carrier. When the theoretical amount of water had been distilled from the reaction kettle (in this case about 31 cc.), the kettle was allowed to cool. The reaction mixture was then neutralized with 15 grams of potassium carbonate and 50 cc. of water, washed twice with 150 cc. of water and finally vacuum distilled to remove ethylene dichloride, water, and the excess methoxyethyl alcohol from the ester obtained.

The ester was substantially water white and of high purity. The ester yield based on the phthalic anhydride consumed was 90% of theoretical compared to a yield of 84.6% of theoretical carrying out the same process employing benzol as the water carrier.

EXAMPLE 3.—PREPARATION OF DI-AMYL PHTHALATE

The alcohol used consisted of the following mixture:

| | Percent |
|---|---|
| Normal amyl alcohol | 26 |
| Iso amyl alcohol | 16 |
| 3 Hydroxy pentane | 8 |
| 2 Hydroxy pentane | 18 |
| 1 Hydroxy 2 methyl butane | 32 |
| | 100 |

Kettle charge

| | Grams |
|---|---|
| Phthalic anhydride | 150 |
| Amyl alcohol mixture listed above | 295 |
| H$_2$SO$_4$ (catalyst) | 2.2 |
| Ethylene dichloride (water carrier) | 125 |

The raw materials were charged into a still kettle and heated to approximately 120° F. when the ethylene dichloride-water binary began coming over at approximately 70° C. With the vapor temperature at 70–73° C., 18 cc. of water came off. During this part of the process the kettle temperature was at 120° C. and slightly above. The ethylene dichloride-water binary upon condensation separated into two layers. The water, or upper layer, was continually drawn off and removed from the system while the ethylene dichloride was continually returned to the esterification kettle to further function as a water carrier. After the esterification was complete the kettle contents were cooled, neutralized with 15 g. potassium carbonate in 50 g. of water, washed twice with 100 cc. of water and vacuum distilled to dry, and to remove the ethylene dichloride and excess amyl alcohols from the ester product.

The ester had a color of approximately one-tenth of that shown by a sample of the same ester prepared in the same manner without the use of a carrier. Yield of product 98.5% based on the phthalic anhydride used.

The above examples have been given merely to illustrate specific embodiments of the invention, but the process may be widely varied without departing from the scope of the invention.

Instead of ethylene dichloride, other alkylene dichlorides may be used, such as methylene dichloride and propylene dichloride. It has been found, however, that, in order to avoid formation of a ternary mixture of the water carrier, alcohol, and water, it is necessary to use an alkylene dichloride having a boiling point at least 30° C. lower than the boiling point of the alcohol being used in the reaction. Where the difference in boiling point between the alkylene dichloride and the alcohol is less than 30° C., the process rapidly loses its efficiency due to formation of a ternary mixture, which distills off and entails a reworking of the water-alcohol layer of the condensate to recover the alcohol.

The process is broadly applicable to esterifications and the particular organic acid being used in the esterification is immaterial unless so highly volatile that its use in this type of esterification process is impractical. Both monocarboxylic and polycarboxylic aliphatic, aromatic, or heterocyclic acids may be employed, such as acetic, propionic, lactic, adipic, stearic, phthalic, and other acids.

The process is applicable to aliphatic alcohols in general, including monohydric or polyhydric alcohols, such as ethyl alcohol, glycol, glycerol, or the like. The process is also applicable to ether alcohols. Among the commonly used alcohols which can be satisfactorily used in this process may be mentioned ethyl, propyl, butyl, amyl, and hexyl alcohols, methoxyethyl alcohol, and ethoxyethyl alcohol. It will be understood that no attempt has been made to specifically name all of the numerous alcohols which one skilled in the art could readily see were adapted for use in this process, the above alcohols being specifically mentioned as particularly commonly used alcohols.

Of the commonly used alcohols, only methyl alcohol is not adapted for use in this process, due to the fact that the boiling point of methyl alcohol is not sufficiently separated from the boiling point of methylene dichloride, the dichloride having the lowest boiling point. Methyl alcohol has a boiling point of 64° C., whereas methylene dichloride has a boiling point of 42° C. and will form a ternary mixture with methyl alcohol and water if used in an esterification reaction employing methyl alcohol.

It will be understood that the particular alkylene dichloride selected in any specific instance must have a boiling point at least 30° C.

lower than that of the alcohol being used. For example, if ethyl alcohol is being used, methylene dichloride functions satisfactorily as the water carrier, whereas ethylene dichloride would not be efficient due to the formation of a ternary mixture with the ethyl alcohol and water.

On the other hand, if butyl alcohol were being used in the reaction, either ethylene dichloride or methylene dichloride could be used as the water carrier, but not propylene dichloride. If amyl or hexyl alcohol, or any one of the higher boiling point ether alcohols, or polyhydric alcohols were being used in the reaction, propylene dichloride, ethylene dichloride, or methylene dichloride could be used satisfactorily.

The process forming the present invention is advantageous in many respects over esterification processes used heretofore. Since no alcohol is removed with the water and the water carrier, there is no necessity of reworking a dilute aqueous solution of alcohol to recover the alcohol. The water vapor formed during the reaction is removed at such a relatively low temperature that the temperature of the reaction mixture itself may be kept relatively low, thus avoiding charring in the kettle and consequent discoloration of the resulting ester; this low temperature in the still kettle also avoids decomposition of the alcohol used in the reaction, and is particularly advantageous in the esterification of acids with the high boiling point alcohols, which in the processes heretofore used have been decomposed to such an extent as to materially reduce the efficiency of the process. For example, the manufacture of diamyl phthalate by processes known heretofore was not commercially feasible, whereas it can be manufactured according to the present process economically on a commercial scale. A further advantage of the present process over the processes employing benzol, and the like, as the water carrier, is that the alkylene dichlorides are non-toxic, whereas the use of benzol affords a considerable health hazard due to its toxicity.

Although the present invention has been described particularly with respect to alkylene dichlorides, carbon tetrachloride may also be used to advantage in this process. It has been found that when employing carbon tetrachloride as the water carrier, it should only be used in reactions wherein the alcohol has a boiling point at least 45° C. higher than the carbon tetrachloride, in order to avoid formation of a ternary mixture of the carbon tetrachloride, alcohol and water.

As many apparently widely different embodiments of this invention may be made without departing from the spirit and scope thereof, it is to be understood that the invention is not limited to the specific embodiments thereof except as defined in the appended claims.

I claim:

1. Process which comprises esterifying an alcohol with an organic carboxylic acid in the presence of an alkylene dichloride having a boiling point of at least 30° C. lower than the boiling point of the alcohol while distilling off, as a binary mixture, from the reaction mixture vapors of the water formed and the alkylene dichloride.

2. Process which comprises esterifying an alcohol with an organic carboxylic acid in the presence of an alkylene dichloride having a boiling point of at least 30° C. lower than the boiling point of the alcohol while distilling off, as a binary mixture, from the reaction mixture vapors of the water formed and the alkylene dichloride, condensing said vapors, allowing same to stratify in two layers and returning the layer comprising chiefly alkylene dichloride to the reaction mixture.

3. Process which comprises esterifying an aliphatic alcohol with an organic carboxylic acid in the presence of a catalyst and an alkylene dichloride having a boiling point of at least 30° C. lower than the boiling point of the alcohol while distilling off, as a binary mixture, from the reaction mixture vapors of the water formed and the alkylene dichloride.

4. Process which comprises esterifying an alcohol with an organic carboxylic acid in the presence of an alkylene dichloride from the group consisting of methylene dichloride, ethylene dichloride and propylene dichloride, said alkylene dichloride having a boiling point of at least 30° C. lower than the boiling point of the alcohol, while distilling off, as a binary mixture, from the reaction mixture vapors of the water formed and the alkylene dichloride.

5. Process which comprises esterifying an aliphatic alcohol having a boiling point of at least 72° C. with an organic carboxylic acid in the presence of an alkylene dichloride from the group consisting of methylene dichloride, ethylene dichloride and propylene dichloride, said alkylene dichloride having a boiling point of at least 30° C. lower than the boiling point of the alcohol, while distilling off, as a binary mixture, from the reaction mixture vapors of the water formed and the alkylene dichloride.

6. Process which comprises esterifying an alcohol having a boiling point of at least 72° C. with an organic carboxylic acid in the presence of methylene dichloride while distilling off, as a binary mixture, from the reaction mixture vapors of the water formed and the methylene dichloride.

7. Process which comprises esterifying an aliphatic alcohol having a boiling point of at least 114° C. with an organic carboxylic acid in the presence of an alkylene dichloride having less than three carbon atoms, while distilling off, as a binary mixture, from the reaction mixture vapors of the water formed and the alkylene dichloride.

8. Process which comprises esterifying an aliphatic alcohol having a boiling point of at least 127° C. with an organic carboxylic acid in the presence of an alkylene dichloride having less than four carbon atoms, while distilling off, as a binary mixture, from the reaction mixture vapors of the water formed and the alkylene dichloride.

9. Process which comprises esterifying methoxyethyl alcohol with phthalic anhydride in the presence of sulphuric acid as a catalyst and ethylene dichloride while distilling off, as a binary mixture, from the reaction mixture vapors of the water formed and the ethylene dichloride.

10. Process which comprises esterifying phthalic anhydride with an aliphatic alcohol having from 4–5 carbon atoms in the presence of sulfuric acid as a catalyst and ethylene dichloride while distilling off as a binary mixture from the reaction mixture vapors of the water formed and the ethylene dichloride.

JOSEPH P. BURKE.